(12) United States Patent
Biskeborn

(10) Patent No.: US 9,928,855 B1
(45) Date of Patent: Mar. 27, 2018

(54) TAPE HEAD AND SYSTEM HAVING ASYMMETRICAL CONSTRUCTION

(71) Applicant: International Business Machines Corporation, Armonk, NY (US)

(72) Inventor: Robert G. Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/339,829

(22) Filed: Oct. 31, 2016

(51) Int. Cl.
G11B 5/187 (2006.01)
G11B 5/008 (2006.01)
G11B 5/48 (2006.01)

(52) U.S. Cl.
CPC .......... G11B 5/187 (2013.01); G11B 5/00813 (2013.01); G11B 5/4893 (2013.01)

(58) Field of Classification Search
None
See application file for complete search history.

(56) References Cited

U.S. PATENT DOCUMENTS

| | | | |
|---|---|---|---|
| 4,479,158 A | 10/1984 | Froehlich et al. | |
| 4,809,110 A | 2/1989 | Hertrich | |
| 4,888,657 A | 12/1989 | Lacey et al. | |
| 5,307,227 A | 4/1994 | Okada et al. | |
| 5,751,527 A | 5/1998 | Sundaram et al. | |
| 6,122,147 A | 9/2000 | Fahimi et al. | |
| 6,151,191 A | 11/2000 | Muftu et al. | |
| 6,633,449 B1 | 10/2003 | Anderson et al. | |
| 6,760,177 B2 | 7/2004 | Biskeborn | |
| 7,193,813 B2 * | 3/2007 | Biskeborn | G11B 5/532 360/121 |
| 7,248,438 B2 | 7/2007 | Biskeborn et al. | |
| 7,382,581 B2 | 6/2008 | Biskeborn | |
| 7,414,811 B2 | 8/2008 | Biskeborn | |
| 7,486,479 B2 | 2/2009 | Nakao et al. | |
| 8,310,783 B2 | 11/2012 | Kawakami et al. | |
| 8,699,169 B2 | 4/2014 | Biskeborn | |
| 8,797,682 B1 * | 8/2014 | Biskeborn | G11B 5/00826 360/121 |
| 8,917,476 B2 | 12/2014 | Holmberg et al. | |
| 9,030,779 B2 | 5/2015 | Dellmann et al. | |
| 9,653,109 B2 | 5/2017 | Biskeborn et al. | |
| 9,837,104 B1 | 12/2017 | Biskeborn | |
| 2004/0061972 A1 | 4/2004 | Biskeborn | |

(Continued)

FOREIGN PATENT DOCUMENTS

JP S55150126 A 11/1980

OTHER PUBLICATIONS

Wu, Yiqian et al., "Design of a Head-Tape Interface for Ultra Low Flying," IEEE Transactions on Magnetics 32, No. 1, 1996, pp. 160-165.

(Continued)

Primary Examiner — William J Klimowicz
(74) Attorney, Agent, or Firm — Zilka-Kotab, P.C.

(57) ABSTRACT

An apparatus according to one embodiment includes a module having a tape bearing surface, a first edge, and a second edge. A first tape tenting region extends from the first edge along the tape bearing surface toward the second edge. A transducer is located in a thin film region of the module. A distance from the first edge to the transducer is less than a distance from the second edge to the transducer. The transducer is positioned in the first tape tenting region.

25 Claims, 15 Drawing Sheets

(56) References Cited

U.S. PATENT DOCUMENTS

| | | | |
|---|---|---|---|
| 2007/0047141 A1 | 3/2007 | Biskeborn et al. | |
| 2008/0049358 A1* | 2/2008 | Biskeborn | G11B 5/1872 360/128 |
| 2008/0170328 A1 | 7/2008 | Kawakami et al. | |
| 2009/0015970 A1 | 1/2009 | Biskeborn et al. | |
| 2009/0174967 A1 | 7/2009 | Biskeborn et al. | |
| 2010/0053810 A1 | 3/2010 | Biskeborn et al. | |
| 2010/0053817 A1 | 3/2010 | Biskeborn et al. | |
| 2010/0134929 A1* | 6/2010 | Ito | G11B 5/0083 360/313 |
| 2011/0013313 A1 | 1/2011 | Bui et al. | |
| 2011/0058271 A1 | 3/2011 | Biskeborn et al. | |
| 2012/0287527 A1 | 11/2012 | Biskeborn et al. | |
| 2012/0300338 A1 | 11/2012 | Biskeborn | |
| 2012/0307396 A1 | 12/2012 | Biskeborn et al. | |
| 2013/0186172 A1 | 7/2013 | Biskeborn et al. | |
| 2014/0063646 A1 | 3/2014 | Biskeborn et al. | |
| 2016/0125900 A1 | 5/2016 | Biskeborn et al. | |
| 2016/0232936 A1 | 8/2016 | Poorman et al. | |

OTHER PUBLICATIONS

Biskeborn et al., U.S. Appl. No. 15/369,651, filed Dec. 5, 2016.
Biskeborn et al., U.S. Appl. No. 15/371,075, filed Dec. 6, 2016.
Biskeborn, R. G., U.S. Appl. No. 15/339,823, filed Oct. 31, 2016.
List of IBM Patents or Patent Applications Treated as Related.
Non-Final Office Action from U.S. Appl. No. 15/339,823, dated Dec. 13, 2016.
Restriction Requirement from U.S. Appl. No. 15/371,075, dated May 4, 2017.
Non-Final Office Action from U.S. Appl. No. 15/369,651, dated Jun. 1, 2017.
Non-Final Office Action from U.S. Appl. No. 15/371,075, dated Jun. 12, 2017.
Ex Parte Quayle from U.S. Appl. No. 15/339,823, dated Jun. 16, 2017.
Notice of Allowance from U.S. Appl. No. 15/339,823, dated Jul. 28, 2017.
Biskeborn, R. G., U.S. Appl. No. 15/697,260, filed Sep. 6, 2017.
Final Office Action from U.S. Appl. No. 15/371,075, dated Sep. 27, 2017.
Biskeborn, R. G., U.S. Appl. No. 15/789,477, filed Oct. 20, 2017.
Biskeborn, R. G., U.S. Appl. No. 15/802,305, filed Nov. 2, 2017.
Advisory Action from U.S. Appl. No. 15/371,075, dated Dec. 8, 2017.
Final Office Action from U.S. Appl. No. 15/369,651, dated Dec. 14, 2017.

* cited by examiner

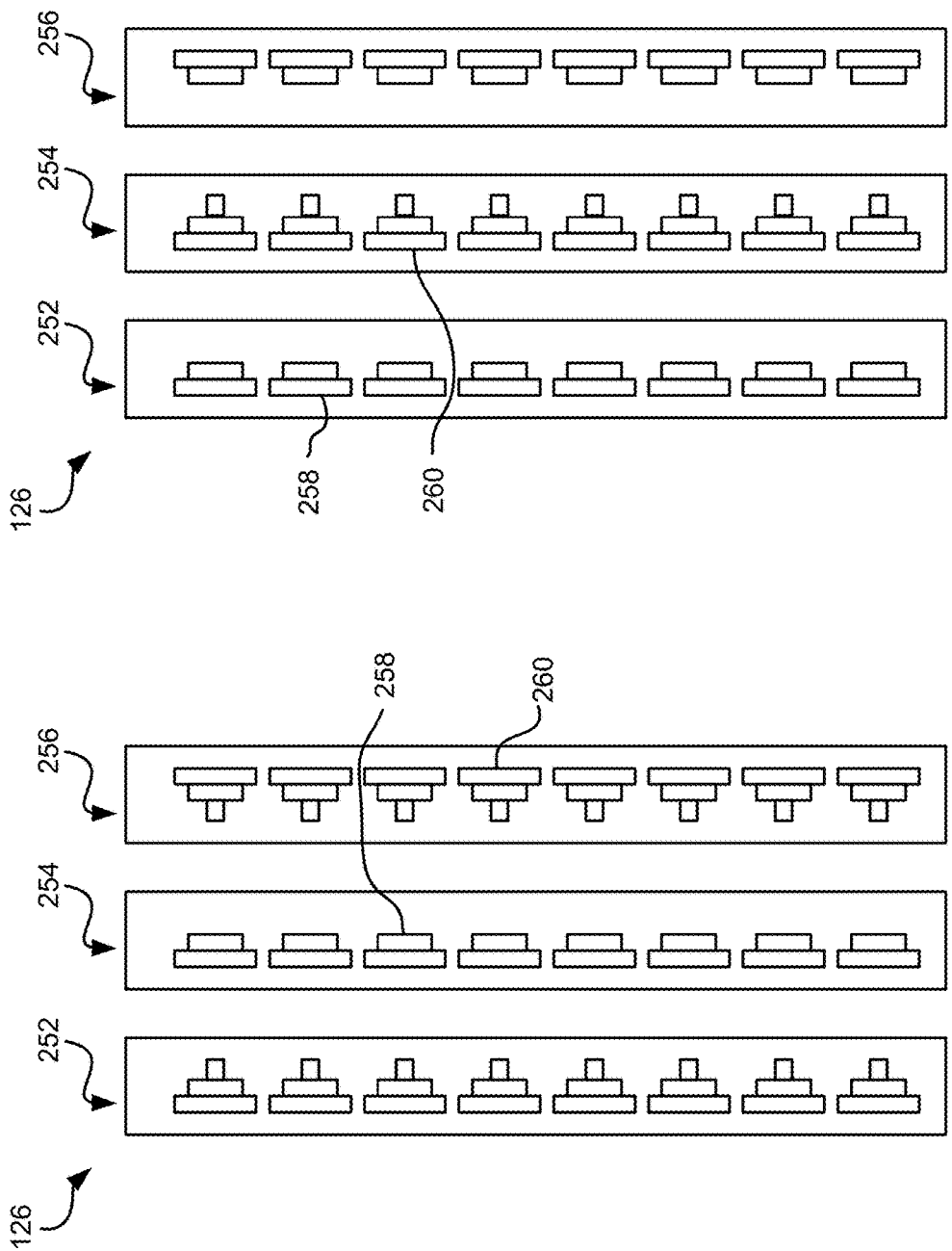

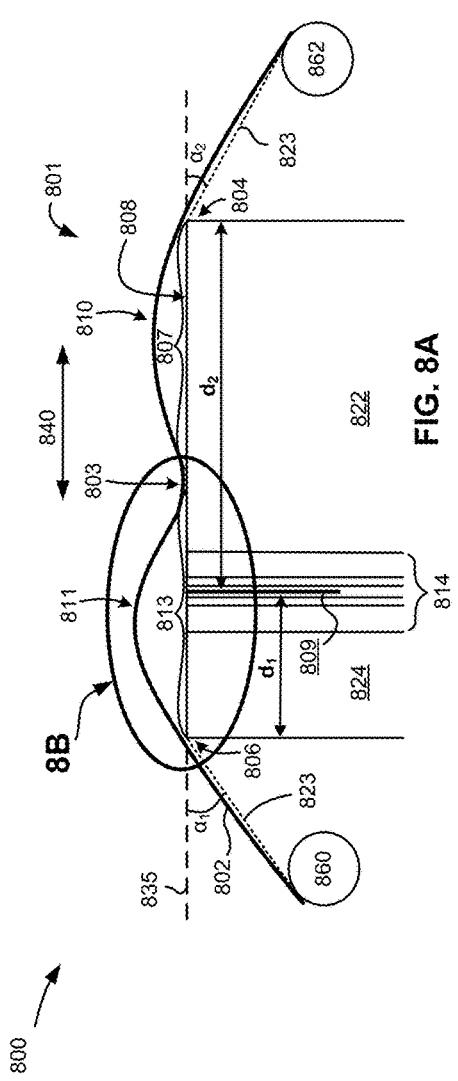
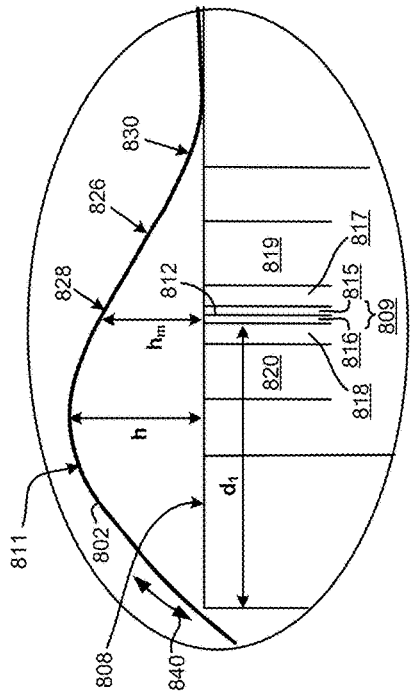

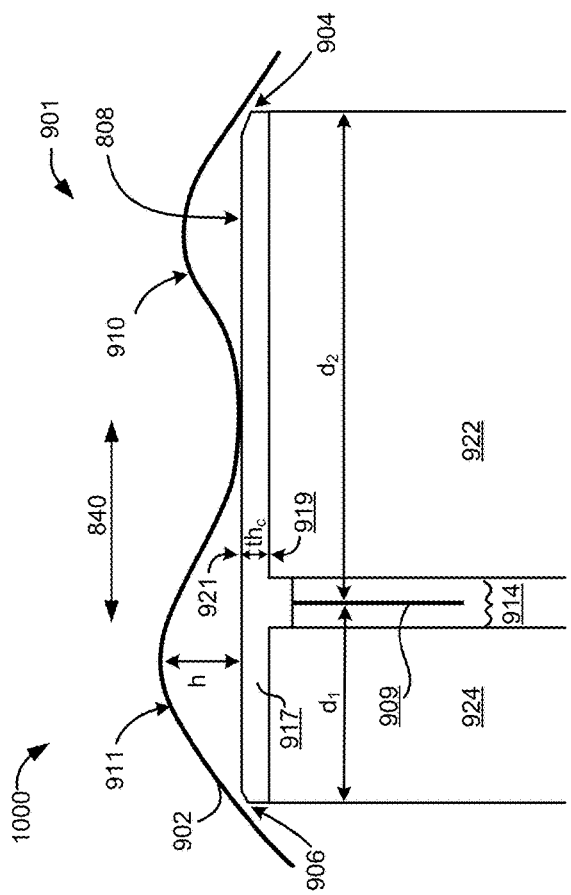
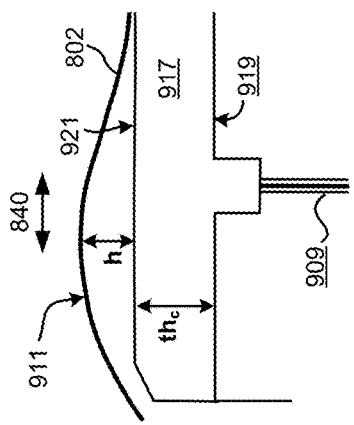
FIG. 10A
FIG. 10B

TAPE HEAD AND SYSTEM HAVING ASYMMETRICAL CONSTRUCTION

BACKGROUND

The present invention relates to data storage systems, and more particularly, this invention relates to magnetic tape recording, more particularly, to an asymmetrical tape head and/or tape recording system with asymmetrical wrap angles.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

An apparatus according to one embodiment includes a module having a tape bearing surface, a first edge, and a second edge. A first tape tenting region extends from the first edge along the tape bearing surface toward the second edge. A transducer is located in a thin film region of the module. A distance from the first edge to the transducer is less than a distance from the second edge to the transducer. The transducer is positioned in the first tape tenting region.

An apparatus according to another embodiment includes a module having a tape bearing surface, a first edge, and a second edge. A first tape tenting region extends from the first edge along the tape bearing surface toward the second edge. A first guide is positioned relative to the first edge for inducing tenting of a moving magnetic recording tape. The location of the tenting is above the first tape tenting region. A second guide is positioned relative to the second edge for inducing tenting of the moving magnetic recording tape. The first guide is positioned relative to the first edge to create a first wrap angle and the second guide is positioned relative to the second edge to create a second wrap angle. The first wrap angle is not the same as the second wrap angle. A transducer is positioned in the first tape tenting region.

Any of these embodiments may be implemented in a magnetic data storage system such as a tape drive system, which may include a magnetic head, a drive mechanism for moving a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

FIG. 8A is a side view of a magnetic tape head according to one embodiment.

FIG. 8B is a detailed view of circle 8B of FIG. 8A according to one embodiment.

FIG. 10A is a side view of a magnetic tape head according to one embodiment.

FIG. 10B is a detailed side view of a magnetic tape head according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a module having a tape bearing surface, a first edge, and a second edge. A first tape tenting region extends from the first edge along the tape bearing surface toward the second edge. A transducer is located in a thin film region of the module. A distance from the first edge to the transducer is less than a distance from the second edge to the transducer. The transducer is positioned in the first tape tenting region.

In one general embodiment, an apparatus includes a module having a tape bearing surface, a first edge, and a second edge. A first tape tenting region extends from the first edge along the tape bearing surface toward the second edge. A first guide is positioned relative to the first edge for inducing tenting of a moving magnetic recording tape. The location of the tenting is above the first tape tenting region. A second guide is positioned relative to the second edge for inducing tenting of the moving magnetic recording tape. The first guide is positioned relative to the first edge to create a first wrap angle and the second guide is positioned relative to the second edge to create a second wrap angle. The first wrap angle is not the same as the second wrap angle. A transducer is positioned in the first tape tenting region.

Figure 1A:
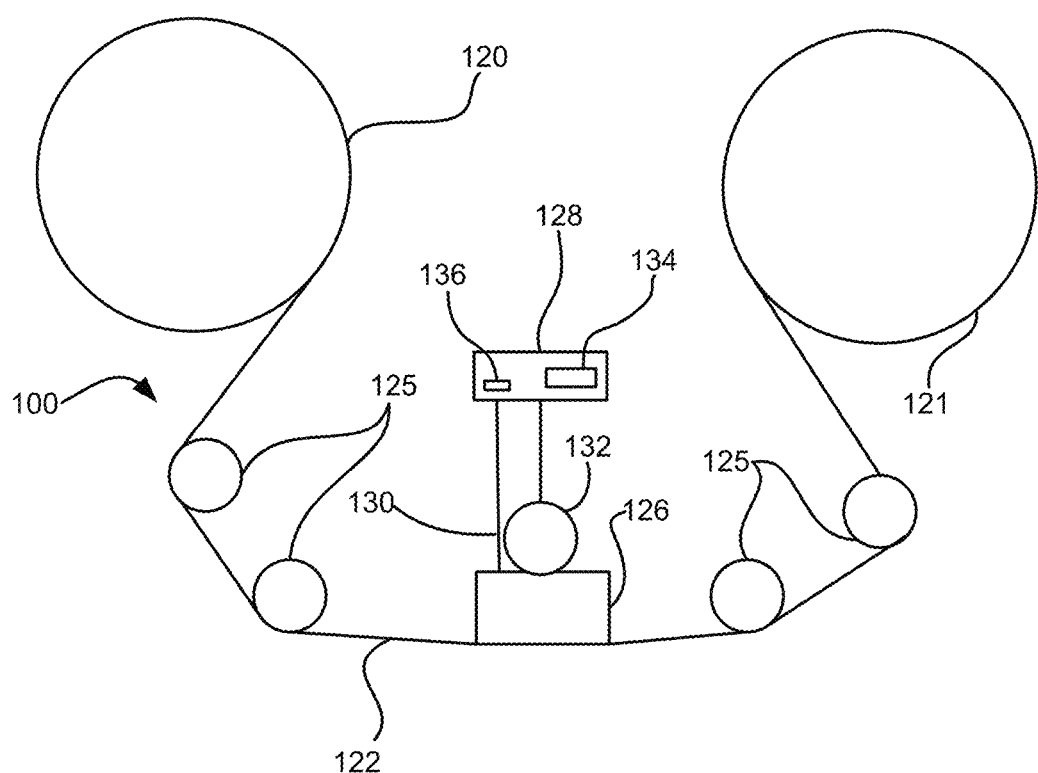
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
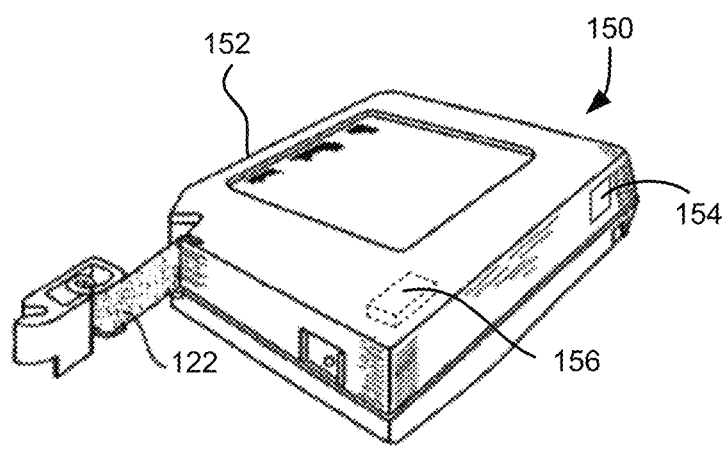
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or another device.

Figure 2:
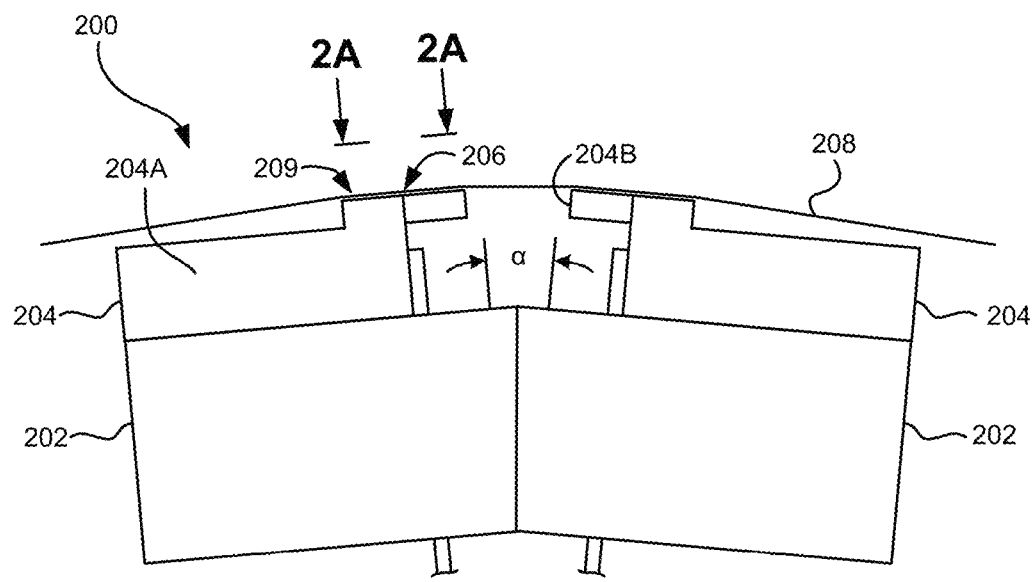
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
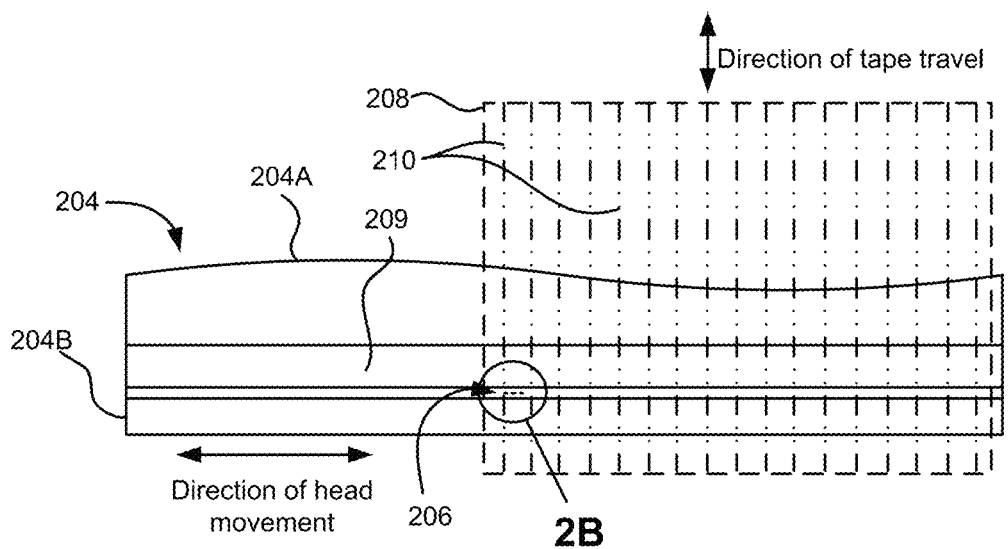
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
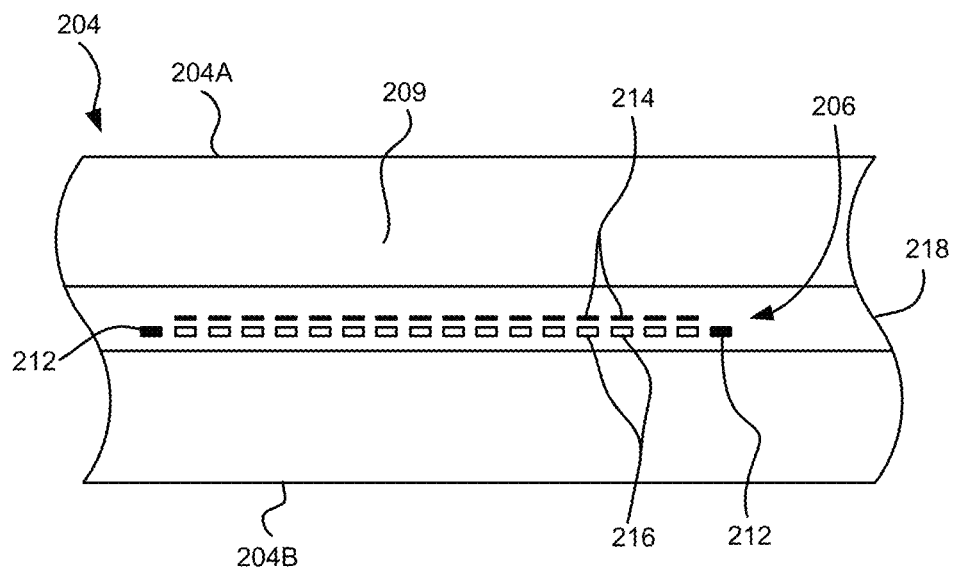
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
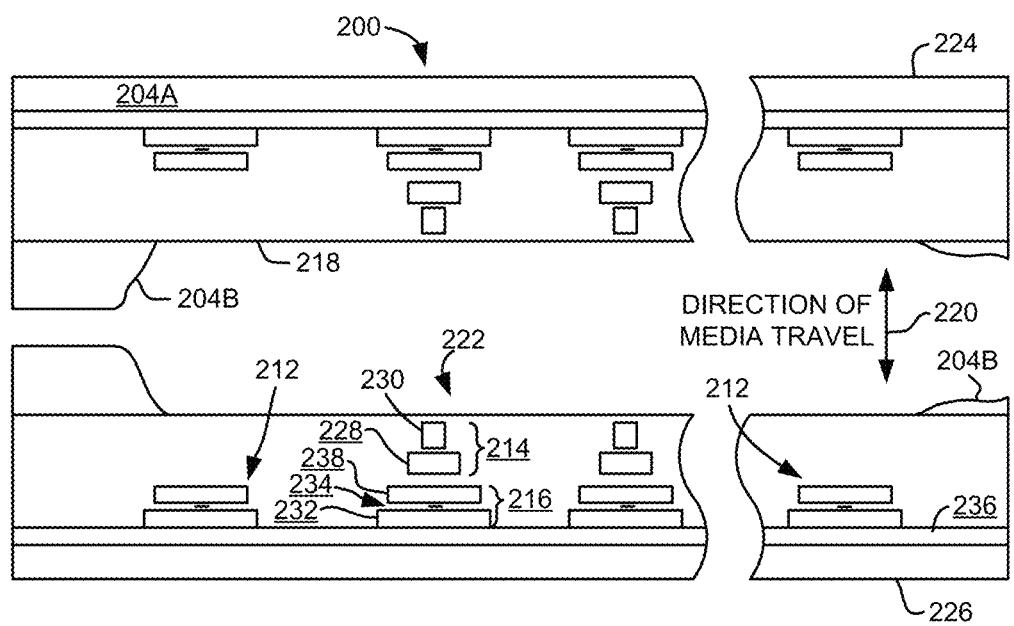
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
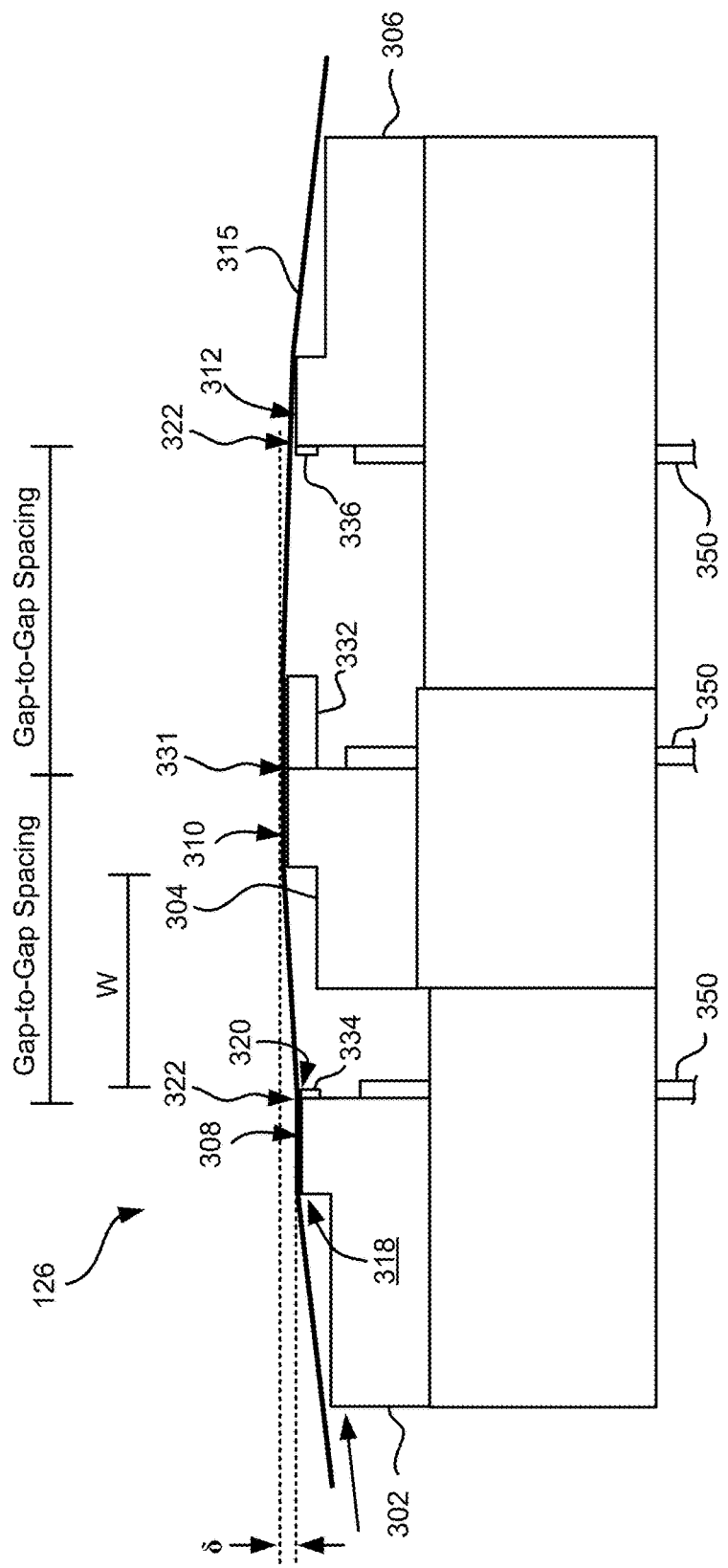
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
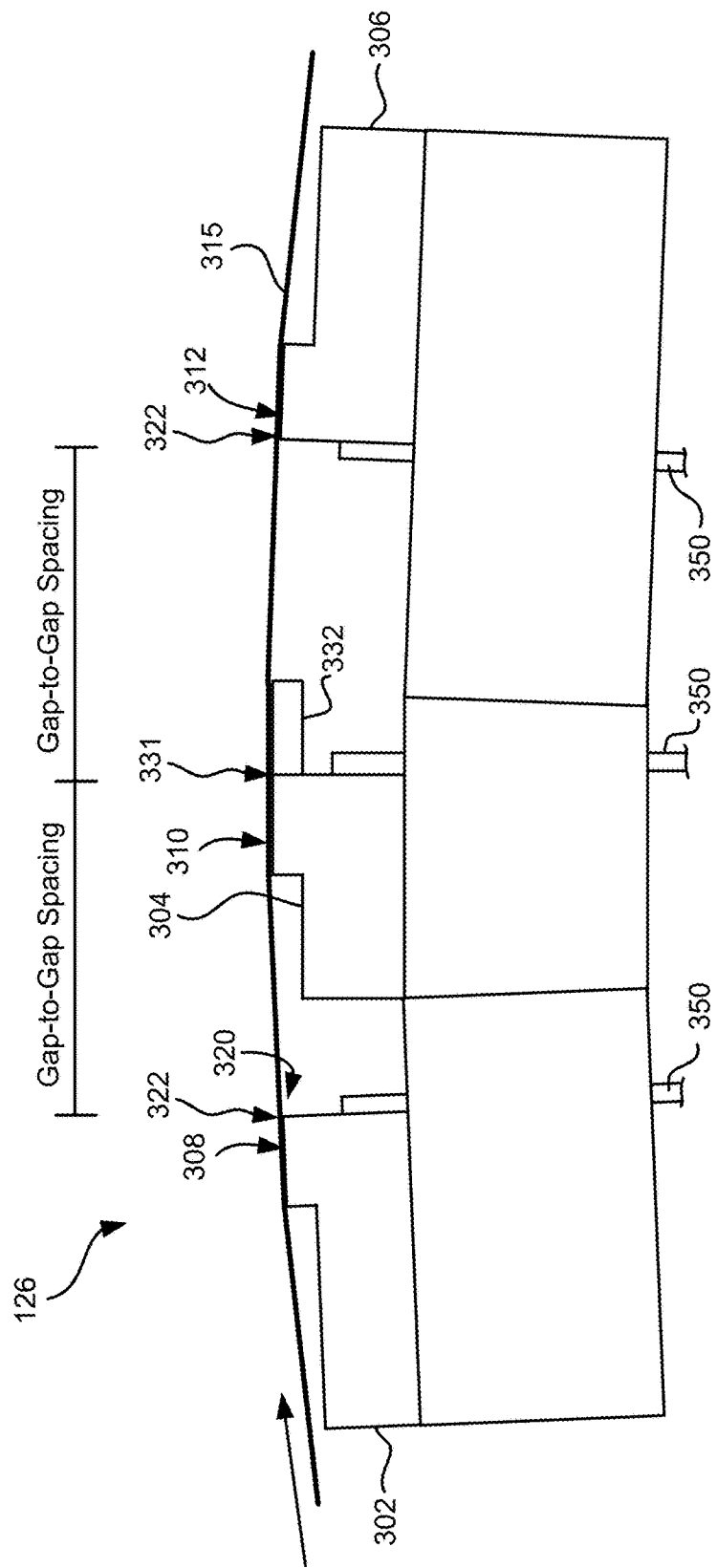
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle is fixed when the modules 302, 304, 306 are coupled together or are otherwise fixed into a head. The inner wrap angle is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle is in a range of about 0.3° to about 1.1°, though can be any angle required by the design.

Beneficially, the inner wrap angle on the side of the module 304 receiving the tape (leading edge) will be larger than the inner wrap angle on the trailing edge, as the tape 315 rides above the trailing module 306. This difference is generally beneficial as a smaller tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and bending stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle of the second module 304. In other words, the planes of the tape bearing surfaces 308, 312 of the outer modules 302, 306 are oriented at about the desired wrap angle of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Additional aspects of the embodiments shown in FIG. 6 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Conventionally, limitations on areal density are imposed by loss of signal quality due to increase in head-media spacing resulting from head wear, or from deposits or other buildup on the head surface. A method used by the industry to counter the effects of head wear includes pre-recessing and coating the magnetic head. However, pre-recession and coating increase magnetic spacing between the tape and the surface of the sensor and may limit achievable recording linear density.

A longer tape bearing surface between the edges of a module may enable minimal tape-to-head spacing may improve resolution and signal output. Specifically, a longer tape bearing surface creates a middle region of the tape bearing surface for the tape to couple with between regions of tenting created by the tape at each edge of the module. However, in TMR heads, minimal spacing between tape and the tape bearing surface of the sensor may result in shorting of the sensor by the moving tape. Unfortunately, shorting of the TMR sensor has the capability to render a TMR sensor partially to completely non-functional.

Particularly, defects in the magnetic medium may cause shorting across the sensor. Conventionally, pre-recessed sensors with very hard coatings on the media bearing surfaces help mitigate wear and shorting due to defects in the magnetic medium passing over the sensor. However, under severe conditions, such as large defects embedded in the media, shorting may still occur in these heads. Moreover, coatings may be susceptible to wear by the tape and thus become less protective over time.

Methods such as pre-recession of the recording gap and/or coating on the tape bearing surface may also be used to control head-tape spacing. However, neither of these methods provide a way to tailor the spacing according to measured head geometry for each head. In addition, when the fabrication processes of the module are complete, there are no previously-known methods to make adjustments to the spacing between the head and tape. Accordingly, because the spacing in conventional heads may be at a minimal spacing, the shorting problem of TMR sensors has been a pervasive barrier to the introduction of TMR to tape recording.

Various embodiments described herein provide, along with heads having transducers such as such as sensors (e.g., data sensors, servo sensors, Hall effect sensors, etc.) and/or write transducers (writer) positioned in the tape tenting region, methods to set the fly height of a tape above the sensors precisely to about a predetermined value that may be independent of variations of head geometry. Furthermore, it is desirable to have a certain approximate predefined spacing between the tape bearing surface of the sensor and the tape because error rate, bit error rate, resolution, and channel parameters are affected by this spacing.

Moreover, manufacturing processes that define the edge of the tape bearing surface near the sensor are subject to variation. In other words, the distance from the edge to the sensor may be controlled within 10 μm in some embodiments which may translate to a variation in spacing between the sensor and tape of the order of a few nanometers. Thus, despite the variable distances of the sensor to the edge closest thereto from head to head, the total spacing between the transducer and the tape can be controlled to a consistent spacing by adjusting the wrap angle. Furthermore, various embodiments described herein include a module arranged asymmetrically on a tape head.

Figure 7A:
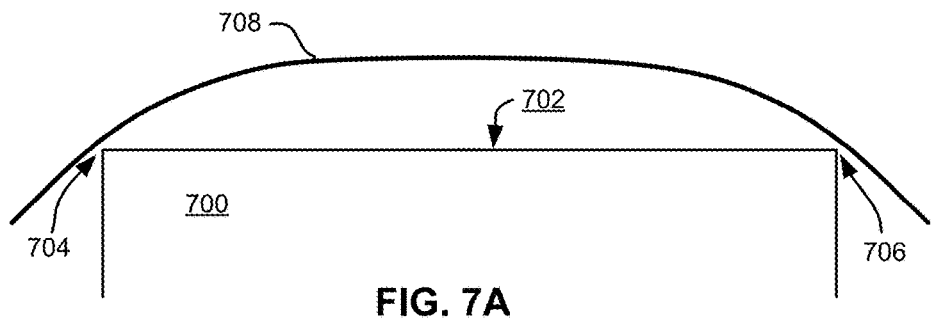
FIGS. 7A-7C are schematics depicting the principles of tape tenting.
Figure 7B:
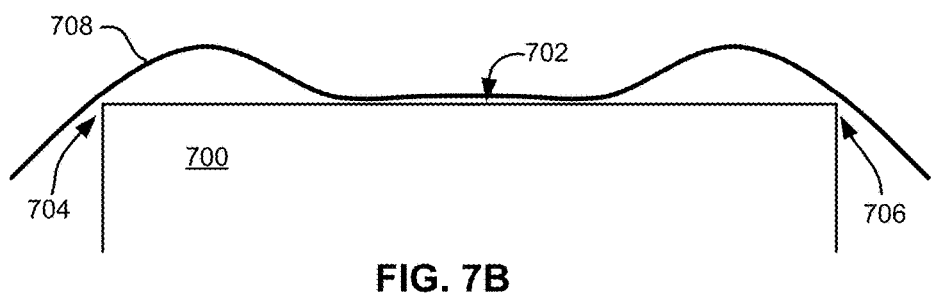
Figure 7C:
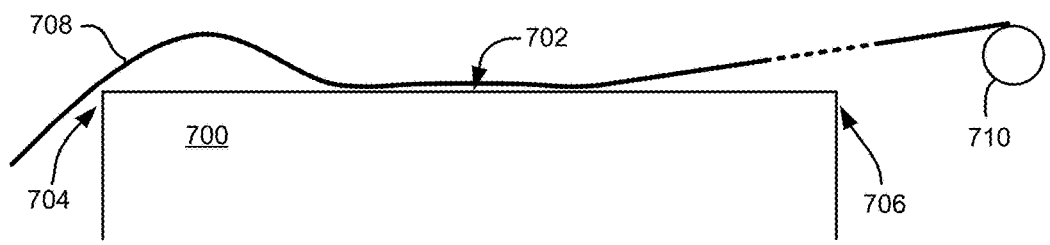

FIGS. 7A-7C illustrate the principles of tape tenting. FIG. 7A shows a module 700 having an upper tape bearing surface 702 extending between opposite edges 704, 706. A stationary tape 708 is shown wrapping around the edges 704, 706. As shown, the bending stiffness of the tape 708 lifts the tape off of the tape bearing surface 702. Tape tension tends to flatten the tape profile, as shown in FIG. 7A. Where tape tension is minimal, the curvature of the tape is more parabolic than shown.

FIG. 7B depicts the tape 708 in motion. The leading edge, i.e., the first edge the tape encounters when moving, may serve to skive air from the tape, thereby creating a subambient air pressure between the tape 708 and the tape bearing surface 702. In FIG. 7B, the leading edge is the left edge and the right edge is the trailing edge when the tape is moving left to right. As a result, atmospheric pressure above the tape urges the tape toward the tape bearing surface 702, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 7C depicts how the subambient pressure urges the tape 708 toward the tape bearing surface 702 even when a trailing guide 710 is positioned above the plane of the tape bearing surface.

The heads depicted in the FIGS. discussed above may be constructed to mitigate the occurrence of shorting due to tape defects by inducing tape tenting above the transducers using the teachings presented herein.

Moreover, the magnetic transducer(s) in any of the embodiments described herein may be sensors (e.g., data sensors, servo sensors, Hall effect sensors, etc.) and/or write transducers (writer). While much of the following description refers to a sensor being present in the tape tenting region, this is done by way of example only, and any type of transducer may be used in any of the embodiments in place of the described sensor.

The following description describes various embodiments with reference to figures. Note that the figures are not drawn to scale, but rather features may have been exaggerated to help exemplify the descriptions herein.

FIGS. 8A-8B depicts an apparatus 800 in accordance with one embodiment. As an option, the present apparatus 800 may be implemented in conjunction with features from any other embodiment listed herein, such as those described with reference to the other FIGS. Of course, however, such an apparatus 800 and others presented herein may be used in various applications and/or in permutations which may or may not be specifically described in the illustrative embodiments listed herein. Further, the apparatus 800 presented herein may be used in any desired environment.

In the embodiment of apparatus 800, the module 801 includes a tape bearing surface 808, a first edge 806, and a second edge 804.

Looking to FIG. 8A-8B, the module 801 preferably includes a thin film region 814 and a CPP sensor 809 (e.g. such as a TMR sensor, GMR sensor, etc. of a type known in the art) that are positioned between the tape support surfaces 822, 824.

According to some embodiments, the sensor 809 may be configured as a data sensor for reading data tracks of a magnetic medium. In some approaches, the apparatus 800 includes one or more arrays of such data sensors.

According to other embodiments, the sensor 809 may be configured as a servo pattern reading sensor of a servo reader. For example, the sensor 809 may be configured as a servo pattern reading sensor where apparatus 800 includes one or more arrays of data sensors and/or writers and one or more servo pattern reading sensors for reading servo data on a medium.

Looking to FIG. 8A-8B, the thin film region 814 may have a first shield 819 and a second shield 820. In addition, the second shield 820 may be positioned proximate to the first edge 806. A CPP sensor 809 (e.g. such as a TMR sensor, GMR sensor, etc. of a type known in the art) is positioned between the first and second shields 819, 820. As would be appreciated by one skilled in the art, the first and second shields 819, 820 preferably provide magnetic shielding for the CPP sensor 809. Thus, one or both of the shields 819, 820 may desirably include a magnetic material of a type known in the art.

Furthermore, in one embodiment of apparatus 800, the sensor 809 in the thin film region 814 of the module 801 may have a reference layer 815. Particularly, as shown in FIG. 8B, the active TMR region of the sensor 809 includes a tunnel barrier layer 812 as the spacer layer 812 positioned between the free layer 816 and the reference layer 815 e.g., of conventional construction. According to various embodiments, the free layer 816, the tunnel barrier layer 812 and/or the reference layer 815 may include construction parameters, e.g., materials, dimensions, properties, etc., according to any of the embodiments described herein, and/or conventional construction parameters, depending on the desired embodiment. Illustrative materials for the tunnel barrier layer 812 include amorphous and/or crystalline forms of, but are not limited to, TiOx, MgO and $Al_2O_3$.

Moreover, the free layer 816 may be positioned between the reference layer 815 and the first edge 806.

First and second spacer layers 817, 818 may also be included in the transducer structure of the thin film region 814 as shown in FIG. 8B. The spacer layers 817, 818 are preferably conductive in some approaches, but may be dielectric in other approaches. The spacer layers 817, 818 preferably have a very low ductility, e.g., have a high resistance to bending and deformation in general, and ideally a lower ductility than refractory metals such as Ir, Ta, and Ti. The first spacer layer 817 is positioned between the sensor 809 and the first shield 819 (e.g., the shield closest thereto). Similarly, the second spacer layer 818 is positioned such that it is sandwiched between the sensor 809 and the second shield 820 (e.g., the shield closest thereto).

As shown in FIGS. 8A-8B, tenting may be induced above the sensitive transducers, thereby minimizing tape-transducer contact in the tenting region. Particularly, when the tape 802 moves across the head, air is skived from below the tape 802 by the leading edge of the tape support surface 824, and though the resulting reduced air pressure in the area between the tape 802 and the tape bearing surface 808 allows atmospheric pressure to urge the tape towards the tape bearing surface 808, the combination of wrap angle and tape bending stiffness causes the tape 802 to lift from the tape bearing surface 808 of the module 801 proximate to the leading edge. Similarly, when the tape 802 moves across the module 801, the tape is also lifted from the tape bearing surface 808 proximate to the trailing edge due to the combination of wrap angle α at the trailing edge and tape bending stiffness. Accordingly, the tenting effect is bidirectional.

For present purposes, the wrap angle α is measured between a plane 835 of the tape bearing surface 808 and a straight line 823 drawn tangent to the tape supporting surface of the respective guide 862, 860 and intersecting the edge 804. As shown, the tape tends to bow as it wraps the edge, and consequently the angle the tape makes relative to the plane 835 of the tape bearing surface 808 at the edge is smaller than the wrap angle α.

Any wrap angle $α_1$ greater than 0° results in a tent 811 being formed by the tape 802 proximate the leading edge 806 of the tape bearing surface 808. A wrap angle $α_2$ greater than 0° at the trailing edge 804 results in a tent 810 being formed by the tape 802 proximate the trailing edge 804 of the tape bearing surface 808. This effect is a function of the wrap angle, tape bending stiffness, tape surface roughness, tape surface compressibility, atmospheric pressure, and tape tension, and to a lesser extent, tape speed. For given geometrical wrap angles for example, stiffer tapes tend to produce larger tents 810, 811. Nonetheless, where conditions such as wrap angle and tape tension are otherwise identical, tapes of a given type from a particular manufacturer tend to exhibit a similar tenting profile whereby the tenting region defined thereunder varies only slightly from tape to tape. Tapes from different manufacturers and/or generations may exhibit dissimilar tenting characteristics under otherwise identical conditions. Fortunately, tenting characteristics are readily determinable using numerical modeling techniques known to those of skill in the art, such as Finite Element Modeling (FEM), Finite Difference Modeling (FDM), etc. and combinations thereof. Nonetheless, differences in tenting characteristics from tape to tape in the same generation under otherwise identical conditions may be considered negligible.

If the wrap angle $α_1$ is high, the tape 802 will tend to bend away further from the tape bearing surface 808 in spite of the vacuum. The larger the wrap angle $α_1$, the larger the tent 810,811. Ultimately, the forces (atmospheric pressure) urging the tape 802 towards the tape bearing surface 808 may be overcome and the tape 802 becomes decoupled from the tape bearing surface 808. Therefore, the wrap angle $α_1$ is preferably selected to provide the desired tenting without destroying the vacuum induced by skiving. In a preferred embodiment of apparatus 800, the wrap angle $α_1$ created by the guide may be in a range of about 0.1 to about 1.5 degrees, but may be higher or lower.

A guide mechanism 860 may be configured to set a wrap angle $α_1$ of the magnetic recording tape 802 at the first edge 806 of the module 801. Another guide mechanism 862 may be configured to set the wrap angle at the second edge 804. One or both of such guide mechanisms 860, 862 may include, e.g., a tape guide such as guide 125 of FIG. 1A, a pitch roller, a tension arm, another module, etc. in any combination.

Multiple modules may be assembled to form a tape head having an internal wrap angle that may be selected based on a measurement of the edge-to-sensor separation for each module.

According to the illustrative embodiment in FIG. 8A, the guide mechanism 860 may be positioned relative to the first edge 806 at a location that induces tenting 811 of a magnetic recording tape 802 moving over the module 801, where the sensor 809 may be positioned under the location of the first tent 811. In some approaches, the guide 860 may be positioned to set a wrap angle of the magnetic recording tape 802 relative to a plane 835 of the tape bearing surface 808. The tape bearing surface 808 is shown to be planar, but may be arcuate in other embodiments.

The length of the tape bearing surface 808 may accommodate tape tenting regions 807, 813 along the tape bearing surface 808. The first tape tenting region 813 is generally defined as the region along the tape bearing surface under the tape 802 as the tape 802 forms a tent 811 while moving. The second tape tenting region 807 is generally defined as the region along the tape bearing surface 808 under the tape 802 as the tape 802 forms the tent 810 while moving. Preferably, the two tents 811, 810 formed by the tape 802 do not overlap and thus the two tents 811, 810 may not interfere with one another.

Furthermore, the module 801 includes a sensor 809 in a thin film region 814, where a distance $d_1$ from the first edge 806 to the sensor 809 may be less than a distance $d_2$ from the second edge 804 to the sensor 809. As shown, the sensor 809 may be positioned in the first tape tenting region 813. Moreover, in some approaches, the distance $d_2$ from the second edge 804 to the sensor 809 may be at least as long as the first tape tenting region 813.

In some approaches, the first distance $d_1$ from the first edge 806 to the sensor 809 may be about equal to a second distance $d_2$ from the second edge 804 to the sensor 809. Where length $d_1$ and length $d_2$ are about equal and the wrap angles $\alpha_1$, $\alpha_2$ are about the same at both edges 806, 804, the sensor 809 within the thin film region 814 may be positioned at about a peak of the locations of the tenting 811 and 810.

Furthermore, the configuration of the two tenting regions 813, 807 along a tape bearing surface 808 may include a region 803 where the tape 802 may not be subject to significant bending from the edges 804, 806 but rather may be essentially parallel to the tape bearing surface 808. Thus, at the region 803, the tape 802 may be in very close contact with the tape bearing surface 808.

With continued reference to FIG. 8A, a second guide 862 may be positioned relative to the second edge 804 for inducing tenting 810 of a moving magnetic recording tape 802, where the first guide 860 positioned relative to the first edge 806 may be positioned to create a first wrap angle $\alpha_1$ and the second guide 862 positioned relative to the second edge 804 may be positioned to create a second wrap angle $\alpha_2$, where the first wrap angle $\alpha_1$ may not be the same as the second wrap angle $\alpha_2$, e.g., are at least 0.1 degree different, and preferably greater than about 0.2 degrees different. In preferred embodiments, the first wrap angle $\alpha_1$ created by the first guide 860 may be in a range of about 0.1 to about 1.5 degrees, but may be higher or lower.

As alluded to above, the second wrap angle $\alpha_2$ may be at a different angle than the first wrap angle $\alpha_1$ to induce tenting having differing characteristics, as described in more detail below. In some approaches, the second wrap angle $\alpha_2$ may be greater than the first wrap angle $\alpha_1$. In other approaches, the second wrap angle $\alpha_2$ may be less than the first wrap angle $\alpha_1$, e.g., as shown in FIG. 8A. In another approach, the second wrap angle $\alpha_2$ may be 0, e.g., as shown in FIG. 9, discussed immediately below.

Figure 9:
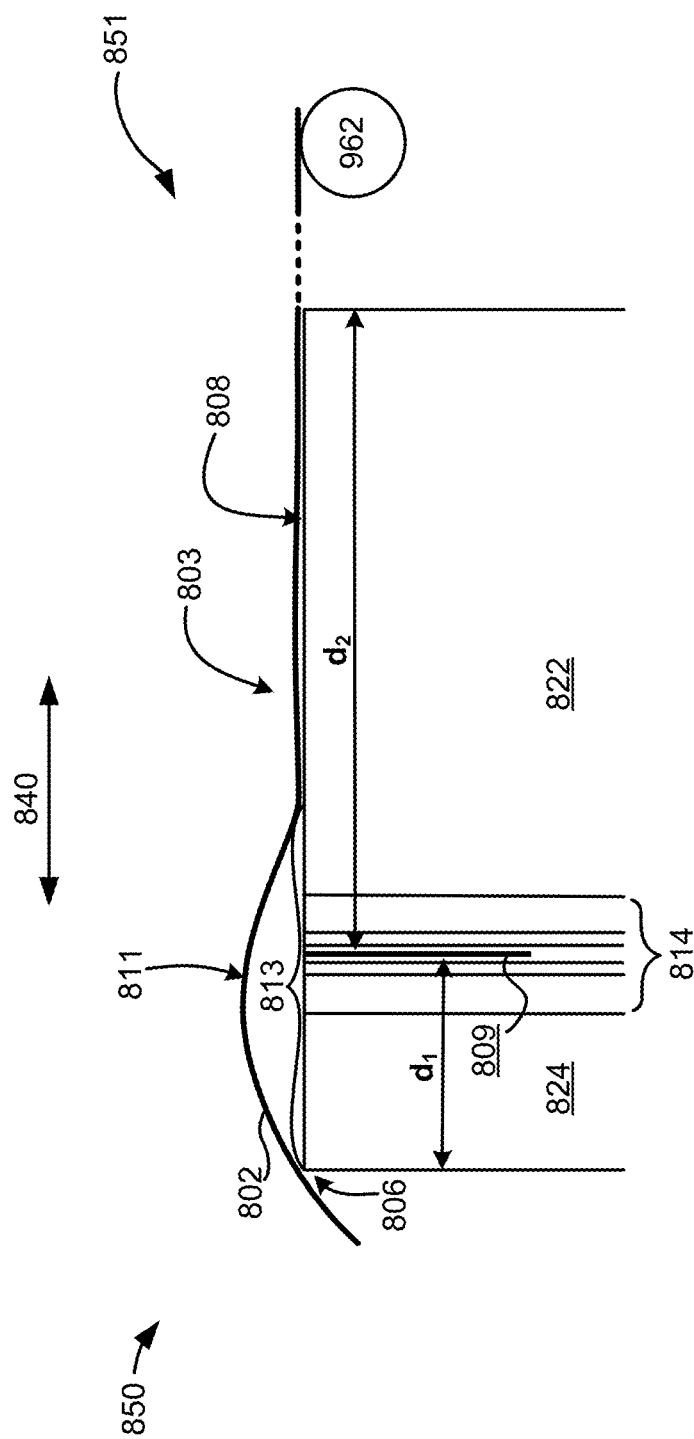
FIG. 9 is a side view of a magnetic tape head according to one embodiment.

FIG. 9 depicts an apparatus 850 in accordance with one embodiment. As an option, the present apparatus 850 may be implemented in conjunction with features from any other embodiment listed herein, such as those described with reference to the other FIGS. Of course, however, such an apparatus 850 and others presented herein may be used in various applications and/or in permutations which may or may not be specifically described in the illustrative embodiments listed herein. Further, the apparatus 850 presented herein may be used in any desired environment.

In one embodiment of apparatus 850 as shown in FIG. 9, the module 851 includes a first guide 860 positioned relative to the first edge 806 to create a first wrap angle $\alpha_1$. There is no second wrap angle. There may be a second guide mechanism 962 in which the tape runs approaches and exits the tape bearing surface adjacent guide 962 without a wrap angle. In some approaches, the first wrap angle $\alpha_1$ created by the first guide 860 may be in a range of about 0.1 to about 1.5 degrees, but could be higher or lower.

Referring once again to FIG. 8B, the guide 860 may be positioned to create an inflection point 826 of the moving magnetic recording tape 802, the inflection point 826 being at a location above the tape bearing surface 808 that may be between the free layer 816 and the second edge 804. In some embodiments, the free layer 816 may be positioned under the convex region 828 of the magnetic recording tape 802, as shown in FIG. 8B. In other approaches, the free layer 816 may be positioned such that the inflection 826 point of the magnetic recording tape 802 is at a location about directly above the tape bearing surface 808 of the free layer 816. In yet other approaches, the free layer 816 may be positioned under the concave region 830 of the magnetic recording tape 802. In preferred embodiments, the sensor is under the convex region 828.

In one embodiment of apparatus 800, the sensor 809 may have a reference layer 815, and a spacer layer 812 positioned between the free layer 816 and the reference layer 815. Moreover, the free layer 816 may be positioned between the reference layer 815 and the first edge 806. In some approaches, the spacer layer 812 may be a tunnel barrier layer.

FIGS. 10A-10B depict an apparatus 1000 in accordance with one embodiment. As an option, the present apparatus 1000 may be implemented in conjunction with features from any other embodiment listed herein, such as those described with reference to the other FIGS. Of course, however, such an apparatus 1000 and others presented herein may be used in various applications and/or in permutations which may or may not be specifically described in the illustrative embodiments listed herein. Further, the apparatus 1000 presented herein may be used in any desired environment.

As shown, apparatus 1000 includes a module 901 having a tape bearing surface 808, a first edge of the tape bearing surface 808 forming a first edge 906, a second edge of the tape bearing surface 808 forming a second edge 904, where tents 910, 911 formed by the magnetic tape 902 may extend from the edges 904, 906 along the tape bearing surface 808.

A sensor 909 is positioned in a thin film region 914 of the module 901. Moreover, the sensor 909 includes a free layer.

Furthermore, the distance $d_1$ from the first edge 906 along the tape bearing surface 808 of the free layer of the sensor 909 may be less than a distance $d_2$ from the second edge 904 to the free layer of the sensor 909.

In other approaches of apparatus 1000, a media facing side of the sensor 909 may be recessed from the tape bearing surface 808.

In an exemplary embodiment, e.g., as shown in FIG. 10, the module 901 includes a wear coating 917 on a media facing side of the sensor 909 where a peak height h may be defined between a peak of the tenting 911 and an upper surface 921 of the coating 917. The thickness the of the coating 917 may be defined by the distance between the upper surface 919 of the tape support surface 922, 924 and the upper surface 921 of the coating 917. In some approaches, the thickness the of the coating 917 may be in a range of between about 0.5 and about 3 times the peak height h. For example, FIG. 10B illustrates a thickness the of a coating 917 that may be about two times the peak height h.

In yet another approach of apparatus 1000, the guide may be a second module having magnetic transducers thereon such as one of the other modules, e.g., as shown in the various FIGS. (see FIG. 6 with two modules and FIG. 7 with three modules).

One embodiment of apparatus 1000 may include a drive mechanism such as a motor or other known mechanism that is configured to cause the tape to move over the first block and a controller electrically coupled to the drive mechanism. For example, the motor or other known mechanism may drive a tape supply cartridge, e.g., tape supply cartridge 120 of FIG. 1A, and a take-up reel, e.g., take-up reel 121 also of FIG. 1A, of a drive in which the block is implemented in, to move the tape media over the block and/or other components of the drive.

Figure 11A:
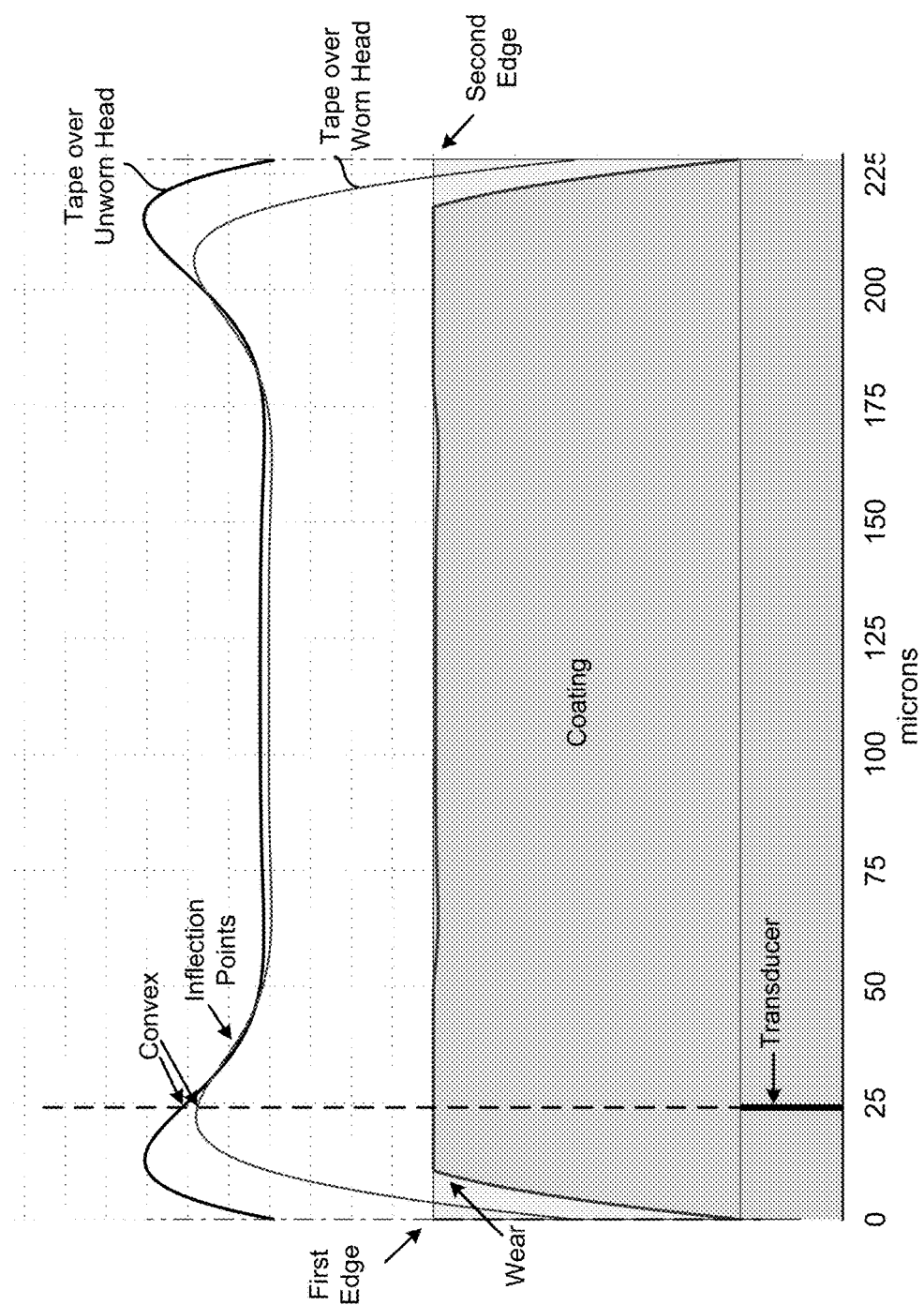
FIG. 11A-11B are graphic examples of Finite Element Modeling (FEM) according to various embodiments
Figure 11B:
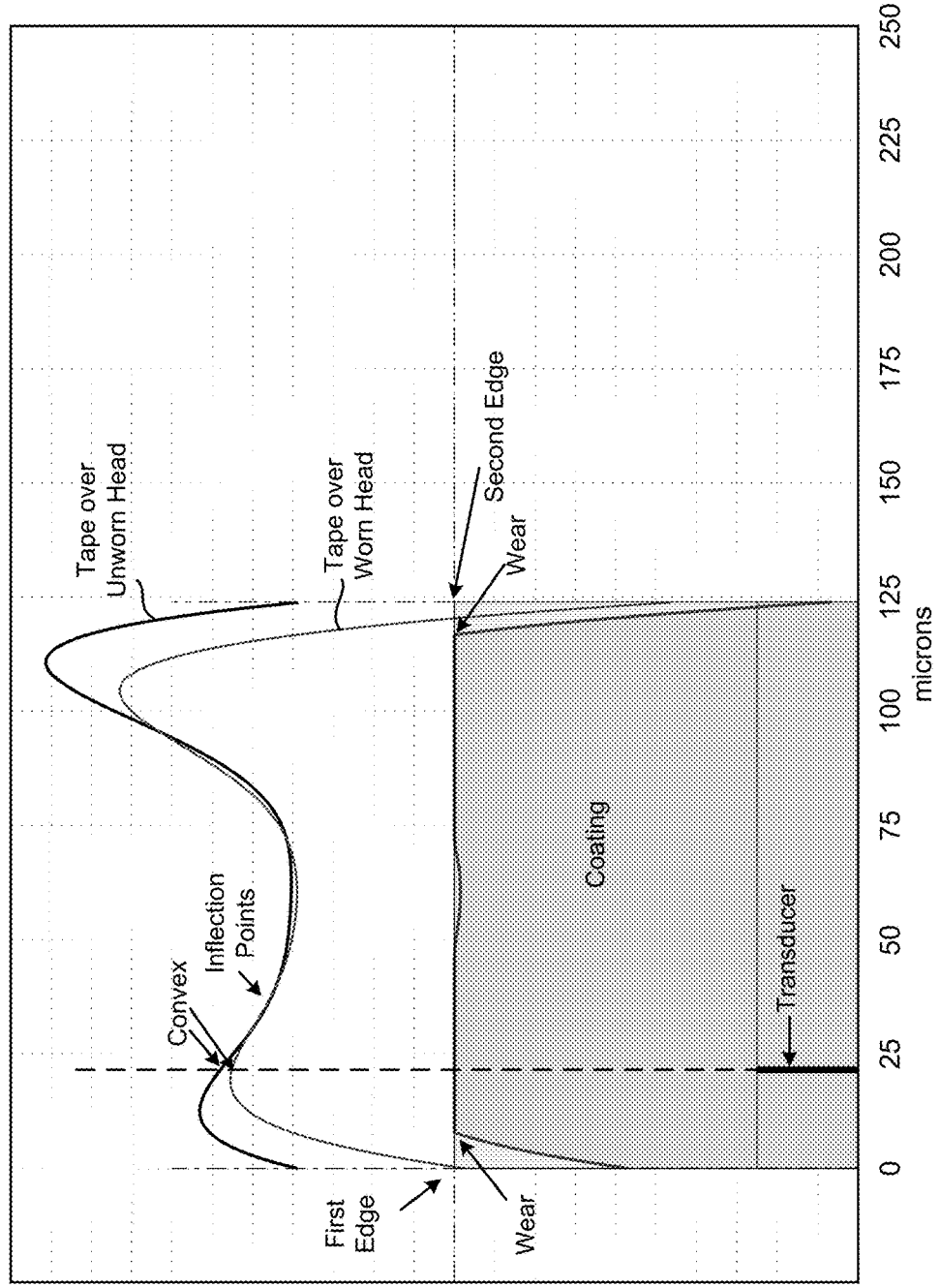

FIGS. 11A-11B represent modeling examples from a Finite Element Modeling (FEM) technique that shows how the wear on the module by the running tape may change the tape profile as the tape head becomes worn. The x-axis shows the distances between the edges of the modules in the two models (0 to 225 µm on the x-axis in FIG. 11A, and 0 to 125 µm on the x-axis in FIG. 11B) with the sensor placed nearest the edge on the left of the head. Preferably, the free layer of the sensor is positioned between the tunnel barrier layer and the first edge in order to mitigate shorting across the TMR sensor.

In the modeling examples of FIGS. 11A and 11B, the y-axis shows the height of the tape and the tenting profile above the module. The upper surface of the coating is indicated by 0 thereby representing the tape bearing surface. The substrate, sensor, and closure show an upper surface (below the coating) at approximately −15 nm on the y-axis. Each figure (FIGS. 11A and 11B) shows the tape profile modeling for different extents of wear of the tape bearing surface, either tape an unworn head with coating (thick black line), or tape over a worn head with coating (thin black line).

FIG. 11A illustrates the modeling wear simulations of a preferred embodiment. Wear near the center of the module is indicated by a slight dip in the upper surface of the coating along the 0 marker of the y-axis. At the edges of the closure and substrate, there is minimal wear since conventional modern tapes are less likely to wear the hard ceramic material of the substrate and closure (the bottom portion −20 and −15 nm on the y-axis). Running the tape over the module will generally cause the coatings to wear, especially at the edges and to a smaller extent in the center of the module (shown in FIG. 11A at the edges of the coating portion, at the 0 on the y-axis). This pattern of head wear may even be seen with very durable coatings.

Wear of the coating slows significantly or effectively stops when the tape begins to contact the edges of the ceramic of the head at the substrate and closure. At this level of wear on the module, the coating tends to acquire a bevel. With continued reference to FIG. 11A, comparing the tape profile of the tape run over an unworn head (thick black line) and the tape run over a worn head (thin black line), it was surprising and unexpected that the tape-to-head spacing above the sensor remained essentially unchanged, thereby suggesting that the spacing was unaffected by the wear.

Furthermore, the region of the tape having a convex curvature (as opposed to a flatter shape at the inflection point) tended to move towards the sensor position. Thus, without wishing to be bound by any theory, the inventor believes that having a thick durable coating gives the surprising benefit that as the coating slowly wears, the curvature of the tape above the sensors may change to a convex shape but may not increase in head-to-tape spacing. In other words, on a coated head, the convex region may move into a desired location above the sensors where the coating is approximately twice as thick as the magnetic head-to-tape spacing (as illustrated in FIG. 10B). In contrast, on the uncoated head, the convex region created by the tape may be closer to the edge and therefore may tend to have higher spacing. Coatings with intermediate thicknesses may produce results in between these two cases.

FIG. 11B illustrates the modeling wear simulation in an embodiment where the land length is significantly shorter (125 µm) than the embodiment shown in FIG. 11A (225 µm). In addition, the wrap angle on the right is relatively large, 0.9 degrees. This embodiment shows that positioning the sensor asymmetrically (towards the first edge of the head) may be combined with a narrow land and asymmetrical wrap angles and large wrap angles. The smaller land with increased wrap angle may result in the tents formed by the tape between the two edges colliding together and thus the length between the tents may not flatten above the module.

The simulation shown in FIG. 11B also demonstrates the surprising and unexpected result that the head-to-tape spacing proximate to the sensor may not be notably affected by wear when the sensor is positioned asymmetrically near one edge. In contrast, the inventor had expected that the absence of a flattened portion of the tape near the center of the module would result in greater head-to-tape spacing above the sensor in the tenting region. Surprisingly, the opposite effect was observed.

Without wishing to be bound by any theory, it appears that any sensitivity to changes with wear may not be dependent on starting shape of the module or wrap angles. Thus, there are advantages to this design. Namely, the asymmetrical head geometry may accommodate variations in tape and head design. Moreover, the wrap angle on the distant edge (second edge) may be adjusted to help stiffen the tape profile along with narrowing the land. In turn, stiffening the tape may improve flutter and help mitigate shorting.

Moreover, as demonstrated by FIG. 11B, the tenting regions may overlap. One way of controlling the amount of overlap without significantly changing the height of the tape above the transducer is to control the second wrap angle at the second edge. This may provide additional bending stiffness in the tape between the peaks, which may reduce tape jitter and may improve signal quality. This may also be facilitated by making the distance between the two edges smaller.

Figure 12:
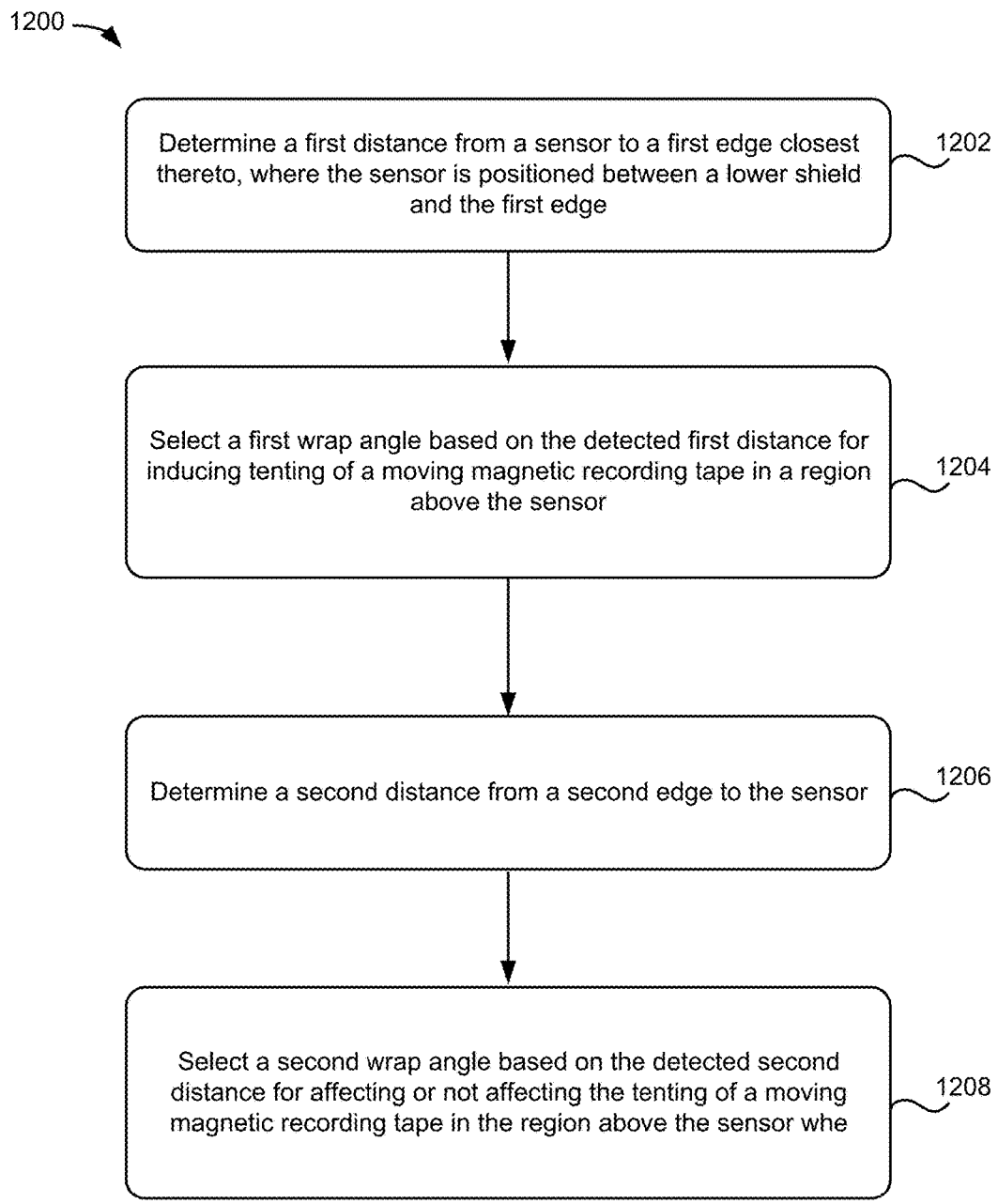
FIG. 12 is a flow chart of a method according to one embodiment.

FIG. 12 depicts a method 1200 for determining a wrap angle to induce a desired tenting in accordance with one embodiment. As an option, the present method 1200 may be implemented in conjunction with features from any other embodiment listed herein, such as those described with reference to the other FIGS. Of course, however, such a method 1200 and others presented herein may be used in various applications and/or in permutations which may or may not be specifically described in the illustrative embodiments listed herein. Further, the method 1200 presented herein may be used in any desired environment.

According to one embodiment as shown in FIG. 12, method 1200 includes a step 1202 of determining a distance from a first edge to a sensor of a module. Looking to FIG. 8B which represents the circle 8B in FIG. 8A, a distance $d_1$ may represent the length of the portion between the edge 806 and the sensor 809. As illustrated in FIG. 8B, the media bearing surfaces 808 of the module 801 may be primarily planar. In embodiments where the media bearing surface 808 of the module 801 is primarily planar, the planar portions of the media bearing surface 808 may lie along a common plane 835.

In one embodiment, the distance $d_1$ is a stored value that is retrieved. In another embodiment, the distance $d_1$ is detected. In some approaches, the distance $d_1$, from first edge 806 to sensor 809, and/or the distance $d_2$ from the second edge 804 to the sensor 809, may be measured mechanically using conventional techniques. For example, atomic force microscopy and/or stylus profilometry may be used. In other approaches, the distance $d_1$ and/or distance $d_2$ may be measured optically using conventional techniques. For example, machine vision may be used. In one approach, laser or other optical interferometry may be used. Preferably, the resolution of the optical detector is in the sub-micron level. The module may have a distance $d_1$ from edge 806 to sensor 809, of less than 100 μm in order for the module to be wide enough for accurate positioning of the guide to determine a wrap angle $\alpha_1$.

With continued reference to FIG. 12, method 1200 includes a step 1204 of selecting a first wrap angle based on the detected distance for inducing tenting of a magnetic recording tape in a region above the sensor when the magnetic recording tape moves over the module. For example, looking to FIG. 8B a wrap angle $\alpha_1$ may be selected based on the distance $d_1$ for inducing a tenting of a magnetic recording tape 802 in a region (e.g. region of tenting 811) above the sensor 809 when the magnetic recording tape 802 moves across the module.

In various embodiments of method 1200, the wrap angle may be selected based on one or more desired tenting characteristics that are variable with changing wrap angle.

One such tenting characteristic is peak height of the tenting formed at a particular wrap angle $\alpha_1$. See, e.g., peak height h of a tent 811 in FIG. 8B. Another tenting characteristic is tent height $h_m$ directly above the transducer. In some approaches, the peak height h and/or tent height $h_m$ may be in a range of from about 5 to about 30 nanometers from a media bearing surface 808 of media support surface 824, but could be higher or lower. In various approaches, the peak height h and/or tent height $h_m$ may be measured from the plane of the media facing surface of a sensor or from the media facing surface of a sensor that is recessed from the plane of the tape support surface (see FIGS. 10A and 10B).

In some approaches, the tenting characteristic may be a length of a tent 811 formed at a particular wrap angle $\alpha_1$.

Tenting characteristics corresponding to differing wrap angles may be determined experimentally, e.g., by running a tape over the module and measuring characteristics; determined via modeling; extrapolated from experimental or modeled data; etc. Tenting characteristics may be approximated and/or averaged across several different types of tapes that are compatible with the module to select a wrap angle that is a best fit for all types of tape. In some approaches, the wrap angle may be selected under an assumption that the tenting characteristics of all tapes suitable for use with the module behave in a substantially similar manner and therefore any commercially-available tape may be used in experimentation or modeling to determine the tenting characteristics.

In another approach, wrap angles may be calculated for each of a plurality of magnetic recording tapes from different manufacturers to create a similar desired tent region above the tape bearing surface of the sensor. The results can be stored in a table and applied when each particular tape is detected by the drive.

Whichever approach is used to determine a wrap angle, the determined wrap angle(s) may be output, e.g., for use in positioning components of a tape drive for creating the desired wrap angle.

With continued reference to FIG. 12, method 1200 includes a step 1206 of determining a distance from a second edge to a sensor of a module. Looking to FIG. 8A, a distance $d_2$ may represent the length of the portion between the second edge 804 and the sensor 809. The media bearing surfaces 808 of the module 801 may be primarily planar. In embodiments where the media bearing surface 808 of the module 801 is primarily planar, the planar portions of the media bearing surface 808 may lie along a common plane 835.

With continued reference to FIG. 12, method 1200 includes a step 1208 of selecting a second wrap angle based on the detected distance for inducing tenting of a magnetic recording tape in a region above the sensor when the magnetic recording tape moves over the module. For example, looking to FIG. 8A a wrap angle $\alpha_2$ may be selected based on the distance $d_2$ for affecting or not affecting the tenting of the magnetic recording tape 802 in a region (e.g. region of tenting 811) above the sensor 809 when the magnetic recording tape 802 moves across the module. The second wrap angle on the $\alpha_2$ may be selected to further adjust the height of the tape tent, or to have no effect at all.

In various embodiments of method 1200, the wrap angle may be selected based on one or more tenting characteristics that vary with changing wrap angle.

In one embodiment of method 1200, consideration may be given to whether the wrap angles are to be set using a second module. If so, then positioning a second module may be used to set the selected wrap angle. If not, positioning a guide may be used to set the selected wrap angle.

In some approaches, one or both of the wrap angles $\alpha_1,\alpha_2$ may be set in the drive by dynamic guides. One approach employs eccentric rollers, whereby the offset axis creates an orbital arc of rotation, allowing precise alignment of the wrap angles $\alpha_1,\alpha_2$. Alternatively, outriggers of a type known in the art may be used to set the wrap angles $\alpha_1,\alpha_2$.

In some embodiments, the wrap angles $\alpha_1,\alpha_2$ may be dynamically set in the drive. In one approach, a dynamically-positionable tape head may be used with fixed rollers. In another approach, the wrap angles $\alpha_1,\alpha_2$ may be set by a positionable tape support within the drive. Following method 1200 in which the distance of the sensor to the edge closest thereto is measured and may be used to determine the wrap angle at a given sensor-to-tape spacing, the tape guide may be adjusted to set the desired wrap angle.

Magnetic recording tapes from different manufacturers may perform differently as the tape runs over the edge. Thus, different wrap angles may be calculated for magnetic recording tapes from different manufacturers to create a similar desired tent region above the tape bearing surface of the sensor. Various embodiments described herein provide a method to determine a wrap angle for a magnetic recording tape over a sensor.

Figure 13:
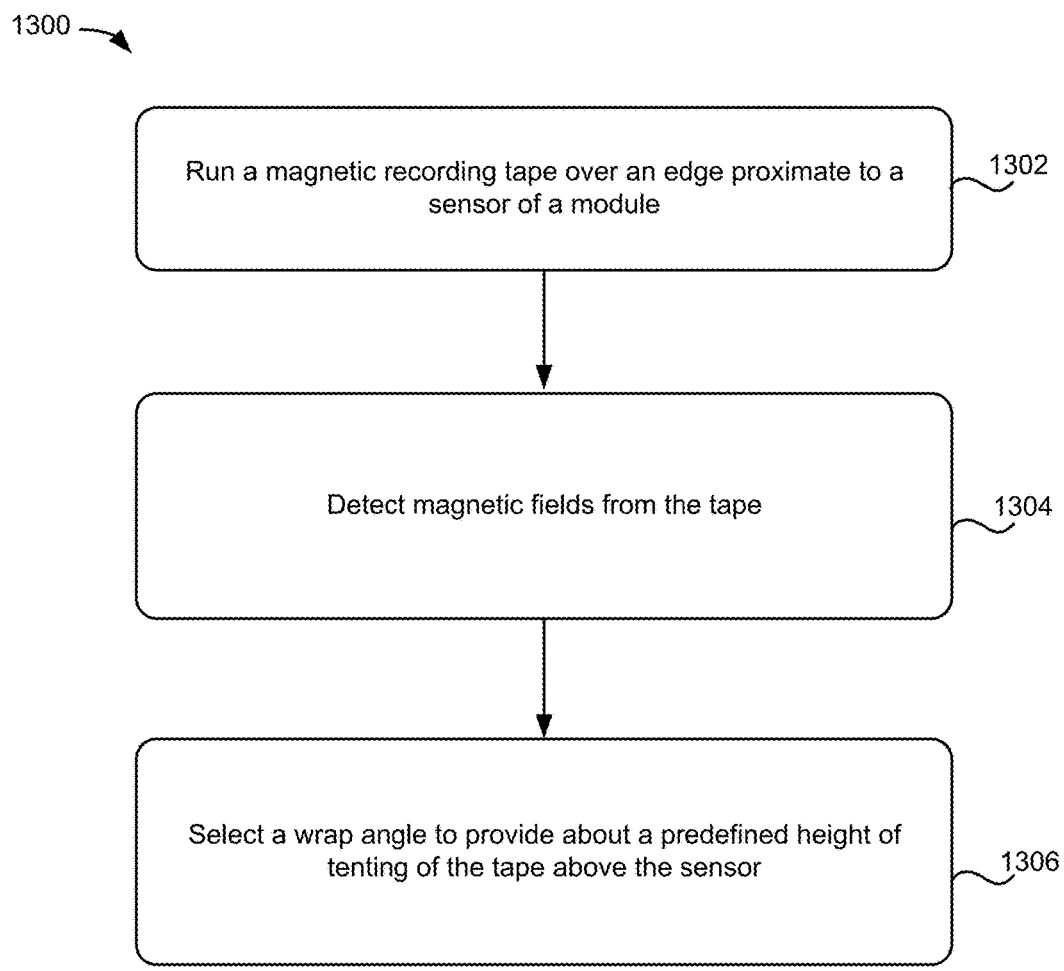
FIG. 13 is a flow chart of a method according to one embodiment.

FIG. 13 depicts a method 1300 in accordance with one embodiment. As an option, the present method 1300 may be implemented in conjunction with features from any other embodiment listed herein, such as those described with reference to the other FIGS. Of course, however, such a method 1300 and others presented herein may be used in various applications and/or in permutations which may or may not be specifically described in the illustrative embodiments listed herein. Further, the method 1300 presented herein may be used in any desired environment.

As shown in FIG. 13, in one embodiment of method 1300, step 1302 includes running a magnetic recording tape over an edge adjacent a sensor of a module.

Step 1304 of method 1300 involves detecting magnetic fields from the tape e.g., data, where an extent of spacing is detectable as spacing loss, and representative of the distance at differing wrap angles of the tape over the edge for a height of tenting of the tape above the sensor.

Step 1306 of method 1300 includes selecting one of the wrap angles to provide about a desired height of tenting of the tape above the sensor. In preferred embodiments, the portion of the tape directly above the sensor is convex. See, e.g., FIG. 11A.

In some approaches, method 1300 may involve positioning a second module to set the selected wrap angle. In other approaches, method 1300 may involve positioning a guide to set the selected wrap angle.

In some approaches to method 1300, the wrap angle may be selected based on a tenting characteristic that varies with changing wrap angle. In other approaches, the tenting characteristic may be a peak height of a tent formed at a particular wrap angle. In yet other approaches, the peak height may be in a range of from about 5 to about 30 nanometers from a media facing side of the transducer.

In another embodiment of method 1300 the tenting characteristic may be a length of a tent formed at a particular wrap angle.

Figure 14:
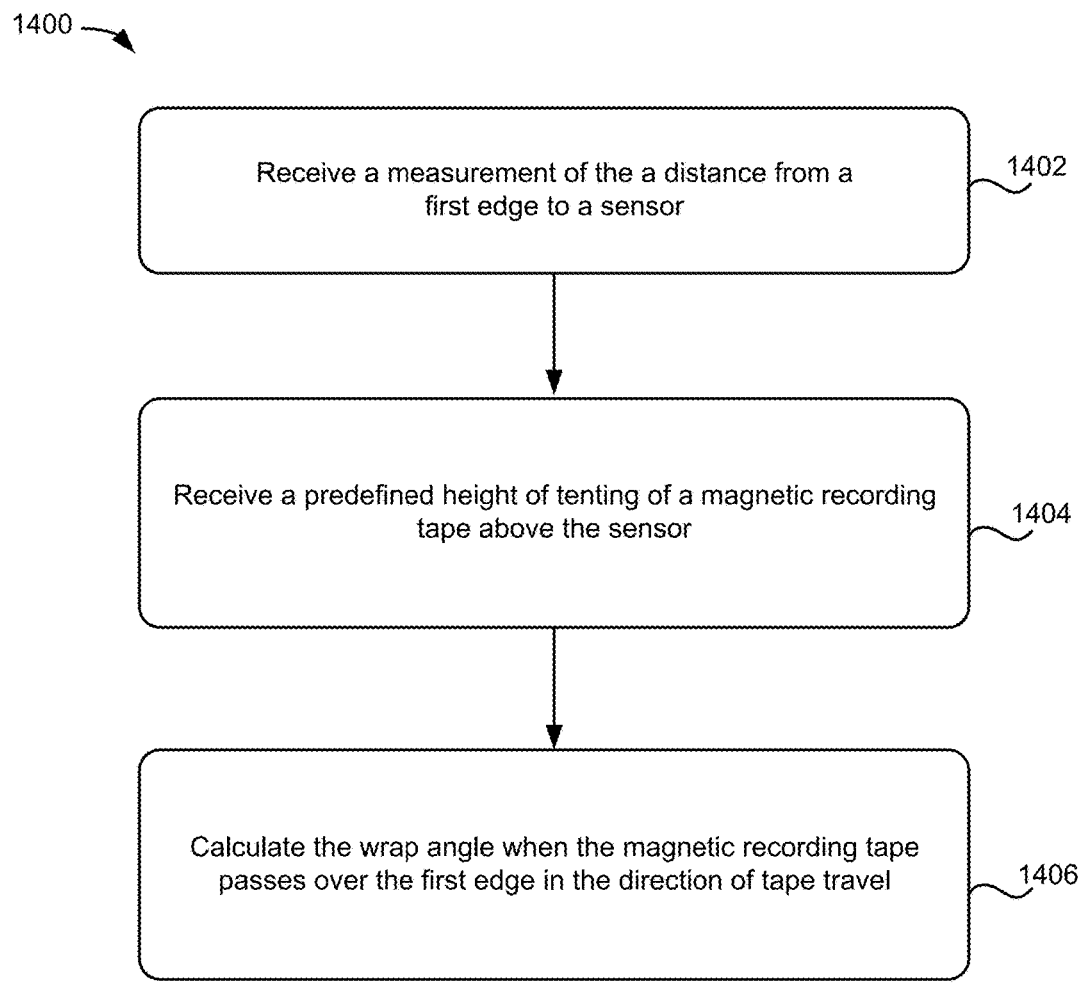
FIG. 14 is a flow chart of a method according to one embodiment.

Now referring to FIG. 14, a flowchart of a method 1400 is shown according to one embodiment. The method 1400 may be performed in accordance with the present invention in any of the environments depicted in FIGS. 1-12, among others, in various embodiments. Of course, more or less operations than those specifically described in FIG. 14 may be included in method 1400, as would be understood by one of skill in the art upon reading the present descriptions.

Each of the steps of the method 1400 may be performed by any suitable component of the operating environment. For example, in various embodiments, the method 1400 may be partially or entirely performed by a controller, a processor, a tape drive, or some other device having one or more processors therein. The processor, e.g., processing circuit(s), chip(s), and/or module(s) implemented in hardware and/or software, and preferably having at least one hardware component, may be utilized in any device to perform one or more steps of the method 1400. Illustrative processors include, but are not limited to, a CPU, an ASIC, a FPGA, etc., combinations thereof, or any other suitable computing device known in the art.

As shown in FIG. 14, method 1400 may initiate with operation 1402 where the processor receives a measurement of the distance from a first edge to a sensor. The distance may be measured optically, such as using autocollimators and/or laser focusing. In other approaches, the distance may be measured mechanically.

Method 1400 may proceed with operation 1404 in which the processor receives a predefined height of tenting of a magnetic recording tape above the sensor.

Method 1400 includes operation 1406 where the processor calculates the wrap angle when the magnetic recording tape moves over the module.

In some embodiments of method 1400, a module of a tape head may be adjusted in a vertical direction to create the calculated wrap angle when the magnetic recording tape moves over the module.

In other embodiments of method 1400, a guide may be set to create the calculated wrap angle of the magnetic recording tape.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a module having a tape bearing surface, a first edge, and a second edge, wherein a first tape tenting region of the tape bearing surface extends from the first edge along the tape bearing surface toward the second edge, the first edge of the tape bearing surface being a first end of the first tape tenting region, a second end of the tape tenting region being positioned between the first and second edges;
a first guide positioned relative to the first edge for inducing tenting of a moving magnetic recording tape over an entirety of the first tape tenting region; and
a transducer in a thin film region of the module, wherein a distance from the first edge to the transducer is less than a distance from the second edge to the transducer, wherein the transducer is positioned in the first tape tenting region.

2. An apparatus as recited in claim 1, wherein the second end of the tape tenting region is located at a location where the tenting terminates at a point of closest approach of the tape to the tape bearing surface after a peak of the tenting.

3. An apparatus as recited in claim 2, wherein the first guide positioned relative to the first edge is positioned to create a first wrap angle and there is no second wrap angle.

4. An apparatus as recited in claim 3, wherein the first wrap angle created by the first guide is in a range of about 0.1 to about 1.5 degrees.

5. An apparatus as recited in claim 2, wherein the first guide is positioned to create an inflection point of the moving magnetic recording tape at a location above the first tape tenting region of the tape bearing surface that is between the transducer and the second edge.

6. An apparatus as recited in claim 1, comprising a second guide positioned relative to the second edge for inducing tenting of a moving magnetic recording tape above a second tape tenting region of the tape bearing surface,
wherein the first guide positioned relative to the first edge is positioned to create a first wrap angle and the second guide is positioned relative to the second edge to create a second wrap angle,
wherein the first and second guides are positioned for inducing the respective tenting whereby resulting tents do not overlap.

7. An apparatus as recited in claim 6, wherein the first wrap angle is not the same as the second wrap angle.

8. An apparatus as recited in claim 6, wherein the second wrap angle is greater than the first wrap angle.

9. An apparatus as recited in claim 6, wherein the second wrap angle is less than the first wrap angle.

10. An apparatus as recited in claim 1, wherein the transducer is a TMR sensor.

11. An apparatus as recited in claim 1, wherein the tape bearing surface is planar.

12. An apparatus as recited in claim 1, wherein the distance from the second edge to the transducer is at least as long as the first tape tenting region of the tape bearing surface.

13. An apparatus as recited in claim 1, comprising a wear coating on a media facing side of the transducer, wherein a peak height is defined between a peak of a tape tent and an upper surface of the coating, wherein a thickness of the coating is in a range of between about 0.5 and about 3 times the peak height.

14. An apparatus as recited in claim 1, wherein a media facing side of the transducer is recessed from the tape bearing surface.

15. An apparatus as recited in claim 1, further comprising:
a drive mechanism for moving a magnetic medium over the module; and
a controller electrically coupled to the transducer.

16. An apparatus, comprising:
a module having a tape bearing surface, a first edge, and a second edge, wherein a first tape tenting region of the tape bearing surface extends from the first edge along the tape bearing surface toward the second edge, the first edge of the tape bearing surface being a first end of the first tape tenting region, a second end of the first tape tenting region being positioned between the first and second edges;
a first guide positioned relative to the first edge for inducing tenting of a moving magnetic recording tape, wherein the location of the tenting is above an entirety of the first tape tenting region, wherein the second end of the tape tenting region is located at a location where the tenting terminates at a point of closest approach of the tape to the tape bearing surface after a peak of the tenting;
a second guide positioned relative to the second edge for inducing tenting of the moving magnetic recording tape, wherein the first guide is positioned relative to the first edge to create a first wrap angle and the second guide is positioned relative to the second edge to create a second wrap angle,
wherein the first wrap angle is not the same as the second wrap angle,
wherein the first and second guides are positioned for inducing the respective tenting whereby resulting tents do not overlap; and
a transducer positioned in the first tape tenting region.

17. An apparatus as recited in claim 16, wherein a first wrap angle created by the first guide is in a range of about 0.1 to about 1.5 degrees.

18. An apparatus as recited in claim 16, wherein the first guide is positioned to create an inflection point of the moving magnetic recording tape at a location above the tape bearing surface that is between the transducer and the second edge.

19. An apparatus as recited in claim 16, wherein the transducer has a reference layer, a free layer, and a spacer layer positioned between the free layer and the reference layer, wherein the free layer is positioned between the reference layer and the first edge.

20. An apparatus as recited in claim 16, wherein a first distance from the first edge to the transducer is less than a second distance from the second edge to the transducer.

21. An apparatus as recited in claim 20, wherein the second distance from the second edge to the transducer is at least as long as the first tape tenting region of the tape bearing surface.

22. An apparatus as recited in claim 16, wherein the transducer is a TMR sensor.

23. An apparatus as recited in claim 16, wherein a media facing side of the transducer is recessed from the tape bearing surface.

24. An apparatus as recited in claim 16, comprising a wear coating on the tape bearing surface.

25. An apparatus as recited in claim 16, further comprising:
a drive mechanism for moving a magnetic medium over the module; and
a controller electrically coupled to the transducer.

* * * * *